United States Patent Office 3,616,518
Patented Nov. 2, 1971

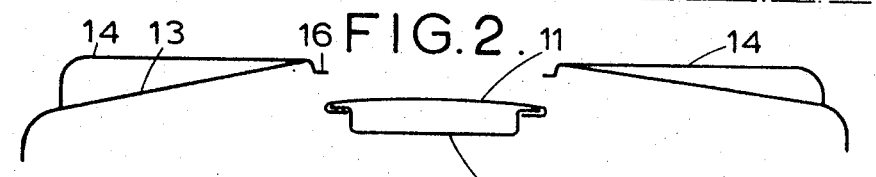
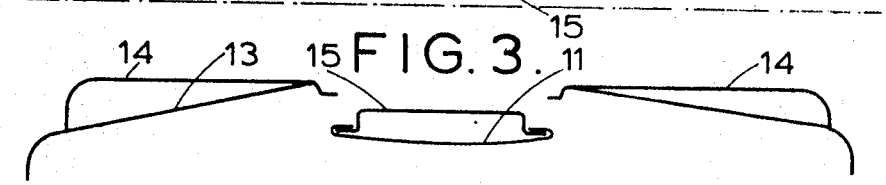
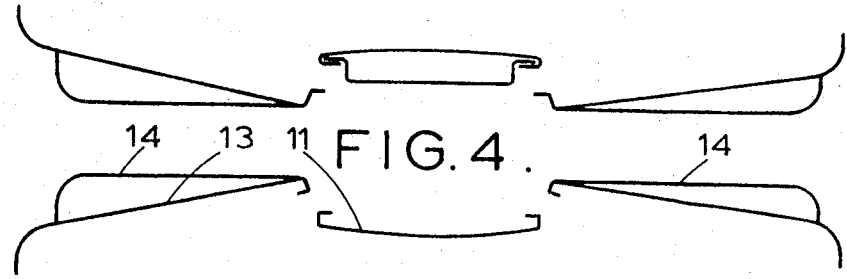
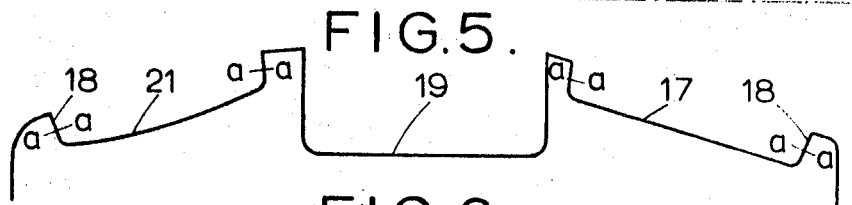
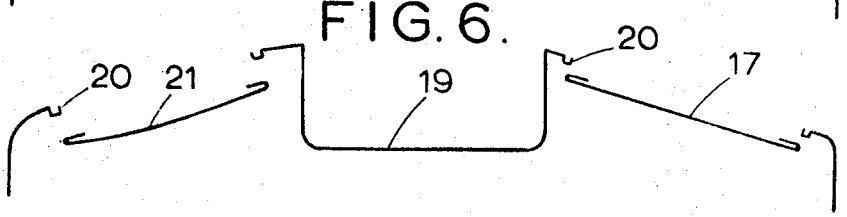

3,616,518
METHOD OF SIMULTANEOUSLY FORMING AN APERTURED PANEL AND A RELATED CLOSURE PANEL
Bernard Brian Hundy, Woodstock, England, assignor to Pressed Steel Fisher Limited, Oxford, England
Filed Mar. 18, 1969, Ser. No. 808,249
Claims priority, application United Kingdom, Mar. 21, 1968, 13,679/68
Int. Cl. B23p 17/00
U.S. Cl. 29—414
4 Claims

ABSTRACT OF THE DISCLOSURE

A method of forming an apertured panel and a closure panel for the aperture or for another aperture in a related apertured panel, which includes forming the closure panel and the apertured panel simultaneously from a single sheet of material with the general planes of the panels mutually displaced by a (preferably tapered) wall portion, the wall portion is then severed to separate the panels and the portions of the wall remaining on one or both panels provides material for clinching over or for forming a flanged edge.

---

This invention relates to a method of simultaneously forming an apertured panel and a related closure panel that is intended to be used as a closure for the aperture in the apertured panel or for a similar aperture in a related panel.

It is often necessary to form panel structures that include an aperture which is provided with a closure panel. When such a panel structure is formed from a relatively thin material, for example, by vacuum forming on thermoplastic plastics or die forming sheet metal, it has been found necessary to form the apertured panel and the closure panel separately in order to allow sufficient material respectively at the periphery of the aperture and at the edge of the closure panel to be clinched over and still provide only a small gap between the closure panel and the apertured panel. Moreover in other cases where a clinched edge is not required it may be required that sufficient material is available to form the door and/or door aperture shut-faces or edges.

The object of this invention is to provide a method of simultaneously forming an apertured panel and a closure panel from a single common sheet.

According to the invention a method of simultaneously forming an apertured panel and a related closure panel includes so forming said panels that their respective planes are mutually displaced by a wall portion formed around the closure panel and connecting the closure panel to the apertured panel.

Preferably the wall portion is slightly tapered to allow easy removal of the panels from a forming die.

The panels may be separated by cutting through or along the wall portion and the wall portion, or each wall portion, may then form the edge or shut face of the closure panel or the aperture, and the wall portion may be clinched over.

It should be understood that the closure panel may be formed to provide a door, lid or the like for the aperture in the apertured panel that is formed simultaneously, or alternatively the closure panel may be formed to provide a door lid or the like for an aperture in a related apertured panel.

Various embodiments of the invention will now be described solely by way of example, with reference to the accompanying drawings in which:

FIG. 1 is a schematic plan view of a side panel structure of a two seater sports car, showing the closure member, or door, in the formed position.

FIG. 2 is a similar view of the structure illustrated in FIG. 1 but showing the door severed from the remainder of the structure and with the severed edges respectively clinched over and flanged.

FIG. 3 is a similar view to FIG. 2 and illustrating the manner in which the door formed with each side panel structure is adapted to fit the other side panel structure.

FIG. 4 is a similar view to FIG. 2 illustrating an alternative arrangement of finishing the severed edges to provide inturned flanges.

FIG. 5 is a schematic elevational view of the central section of a two seater sports car showing the manner in which the bonnet (or hood) and boot (or trunk) lid are formed.

FIG. 6 is a similar view of the section illustrated in FIG. 5 showing the severed edges formed to provide clinched over edges and drain channels.

Referring to FIG. 1, a single sheet of superplastic metal alloy was vacuum formed to provide a complete side panel structure for a two seater sports car including a door panel 11 connected by a tapered wall portion 12 to the remainder of the structure 13 which included the wings (or fenders) 14.

The formed sheet shown in FIG. 1 was then severed through and along the wall portion 12 as indicated by the lines a—a to separate the door panel 11 from the remainder of the panel structure 13. As shown in FIG. 2, the part of the wall portion 12 remaining on the door panel 11 was then clinched over a separately formed door inner panel 15 on a normal clinching tool and the part of the wall portion 12 remaining on the structure 13 was flanged in a flanging press to provide a door frame edge that incorporated a protruding flange 16 for receiving a sealing strip. As will be seen by comparing FIGS. 1 and 2, in this example, the door panel 11 is formed in a reversed, or inverted, position, in the case of a door panel which is symmetrical about a vertical centre line this allows the door panel 11 to be turned over after it has been severed from the remainder of the structure and thereby ensures that the part of the wall portion remaining on the door can be clinched over through a much smaller angle. When the door is not symmetrical the angle through which the edge of the door panel 11 must be clinched over may be reduced in the manner illustrated in FIG. 3. In this case the sides of the vehicle illustrated in FIG. 3 were formed as hereinbefore described with reference to FIG. 1, but the left hand side door was formed with the right hand side panel structure and the right hand side door was formed with the left hand side panel structure thereby again reducing the angle through which the clinched over edge of the door panel had to be turned.

FIG. 4 shows an alternative treatment for the severed edges of the door panel 11 and the remainder of the structure after they have been formed in the manner described with reference to FIG. 1; as will be seen in FIG. 4, the part of the wall portion remaining on the door panel 11 and that on the structure 13 can be formed to provide the edge, or shut face, of the door and the door frame each having inturned flanges on which inner trim panels can readily be mounted, or to which stiffening panels or members may be affixed, and which would increase the rigidity of the respective panels.

FIG. 5 shows a single sheet of superplastic metal alloy vacuum formed to provide a central section of the car including a bonnet (or hood) 21 and a boot (or trunk) lid 17, each connected by a tapered wall portion 18 to the remainder of the section 19. The wall portion 18 was again severed by cutting as indicated by the lines a—a, and as shown in FIG. 6, the part of the wall portions 18 remaining on the remainder of the section 19 were press-formed into drainage channels 20 whilst the part of the wall portions 18 remaining on the bonnet 21 and the boot lid 17 were each clinched over on a normal clinching tool.

What is claimed is:

1. A method of producing an apertured vehicle body panel and a closure panel including the steps of,
    (a) forming a curved body panel having a generally convex configuration on its outside,
    (b) forming a closure panel by displacing a portion of said body panel from its surface, said closure panel joined to said body panel by an integral wall portion, said closure panel being curved with a concave portion facing the outer surface of said body panel,
    (c) separating the closure panel from the body panel by cutting along the integral wall portion intermediate its width, thereby leaving a part of the wall portion on each of said panels,
    (d) clinching a separate, inner panel to said closure panel by bending the remaining wall portion on said closure panel toward the concave side thereof, over peripheral portions of the separate, inner panel.

2. The method of claim 1 wherein the said integral wall portion tapers toward the concave side of said closure panel, prior to the separating step.

3. The method of claim 1 including the additional step of,
    (a) deforming the remaining wall portion on said body panel towards the convex, outer side of said body panel until said portions are coplanar, thereby forming a door frame edge for receiving a sealing strip.

4. A method of producing an apertured vehicle body panel and a closure panel including the steps of,
    (a) forming a curved body panel having a generally convex configuration on its outside,
    (b) forming a closure panel by displacing a portion of said body panel from its surface, said closure panel joined to said body panel by an integral wall portion, said closure panel being curved with a concave portion facing the outer surface of said body panel,
    (c) separating the closure panel from the body panel by cutting along the integral wall portion intermediate its width, thereby leaving a part of the wall portion on each of said panels,
    (d) clinching the remaining wall portion on said closure panel toward the concave side thereof, said integral wall portion tapering toward the concave side of said closure panel, prior to said clinching step,
    (e) deforming the remaining wall portions on said body panel.

References Cited

UNITED STATES PATENTS

| | | | |
|---|---|---|---|
| 932,341 | 8/1909 | Smith | 72—329 |
| 1,380,812 | 6/1921 | Lathrop | 113—120 |
| 2,016,225 | 10/1935 | Bukolt | 263—5 |
| 3,085,324 | 4/1963 | Nelson | 29—416 |

JOHN F. CAMPBELL, Primary Examiner

V. A. DI PALMA, Assistant Examiner

U.S. Cl. X.R.

29—416; 113—116 R, 116 HA, 116 BB